(12) United States Patent
Kang (10) Patent No.: US 11,978,048 B2
(45) Date of Patent: May 7, 2024

(54) REAL TIME DEAL SYSTEM USING MOBILE ADVERTISEMENT PLATFORM AND METHOD THEREFOR

(71) Applicant: Chan Go Kang, Seoul (KR)

(72) Inventor: Chan Go Kang, Seoul (KR)

(*) Notice: Subject to any disclaimer, the term of this patent is extended or adjusted under 35 U.S.C. 154(b) by 0 days.

(21) Appl. No.: 17/912,175

(22) PCT Filed: May 28, 2020

(86) PCT No.: PCT/KR2020/006926
§ 371 (c)(1),
(2) Date: Sep. 16, 2022

(87) PCT Pub. No.: WO2021/187667
PCT Pub. Date: Sep. 23, 2021

(65) Prior Publication Data
US 2023/0139173 A1 May 4, 2023

(30) Foreign Application Priority Data
Mar. 16, 2020 (KR) .......................... 10-2020-0031959

(51) Int. Cl.
*G06Q 30/02* (2023.01)
*G06Q 20/06* (2012.01)
(Continued)

(52) U.S. Cl.
CPC ......... *G06Q 20/387* (2013.01); *G06Q 20/065* (2013.01); *G06Q 30/0214* (2013.01); *G06Q 30/0226* (2013.01); *G06Q 30/0239* (2013.01)

(58) Field of Classification Search
CPC .............. G06Q 20/387; G06Q 20/065; G06Q 30/0214; G06Q 30/0226; G06Q 30/0239
See application file for complete search history.

(56) References Cited

U.S. PATENT DOCUMENTS 7,912,751 B1 * 3/2011 Allos ................. G06Q 30/0214
705/14.1
2002/0171987 A1 11/2002 Dudhwala et al.
(Continued)

FOREIGN PATENT DOCUMENTS

JP 2005-025681 A 1/2005
JP 2006-133931 A 5/2006
(Continued)

OTHER PUBLICATIONS

"Why Loyalty Payment can help digital wallets to break through" (Hofer, Domonic; published Jun. 2013 at https://www.pymnts.com/assets/Uploads/Loylogic-mwallet-Whitepaper.pdf) (Year: 2013).*
(Continued)

*Primary Examiner* — James M Detweiler
(74) *Attorney, Agent, or Firm* — Bridgeway IP Law Group, PLLC; Jihun Kim (57) ABSTRACT

A real-time deal (RTD) method of the present invention comprises the steps of receiving a request to issue an RTD approval number; generating and transmitting an RTD approval number; receiving an RTD request including the RTD approval number; generating and transmitting an RTD discount rate in response to the RTD request; and paying a virtual currency corresponding to the discount amount according to the RTD discount rate.

11 Claims, 8 Drawing Sheets

(51) Int. Cl.
*G06Q 20/38* (2012.01)
*G06Q 30/0207* (2023.01)
*G06Q 30/0214* (2023.01)
*G06Q 30/0226* (2023.01)

(56) References Cited

U.S. PATENT DOCUMENTS

2003/0171987 A1* 9/2003 Amato ............... G06Q 30/0232
 705/14.32
2012/0158480 A1* 6/2012 Sundaram .......... G06Q 30/0207
 705/14.23

FOREIGN PATENT DOCUMENTS

| | | |
|---|---|---|
| JP | 2009-230550 A | 10/2009 |
| KR | 10-2005-0053269 A | 6/2005 |
| KR | 10-2005-0053270 A | 6/2005 |
| KR | 10-2005-0053271 A | 6/2005 |
| KR | 10-1356982 B1 | 2/2014 |
| KR | 10-2018-0031452 A | 3/2018 |
| KR | 10-2019-0046602 A | 5/2019 |
| WO | 2011/129578 A2 | 10/2011 |
| WO | 2013/032131 A1 | 3/2013 |
| WO | WO-2018056689 A1 * | 3/2018 ............. G06Q 20/38 |

OTHER PUBLICATIONS

International Search Report dated Dec. 9, 2020, in connection with International Patent Application No. PCT/KR2020/006926; along with English machine translation.

Written Opinion dated Dec. 9, 2020, in connection with International Patent Application No. PCT/KR2020/006926.

* cited by examiner

- Real-Time Deal Progress Service -
○ Available Time
○ Store Name Search <Affiliated Stores>
* Store Name Input ______
* Region ____ City ____ District ____ Town Search

FIG. 3

Affiliated Stores
○ Store Name :
○ Store Owner :
○ Address <Store> :
○ Products/Services :
○ Available Time :

```
Approval Process For Real-Time Deal Process

○ Input Payment Amount  [        ]
  ○ Input Approval Number [        ]

```
Real-Time Deal Process

*  Total Resourse For RTD: 10,000,000 KRW
  ○  User'S Payment Amount : 100,000 KRW
  ○  Deal Discount Rate [  |  ]% Discount
  ○  Amount of Paid [       ] DL

[Deal Request]    [Complete]
```

FIG. 6

| | | | | |
|---|---|---|---|---|
| ∘ Amount of Accumulated DL | | ∘ The Number of Paid DLs | | |
| 5,000 DLs in Total | | 100 DLs in Total | | |

DL Accumulation History

| Time | Payment Details | Discount Rate | Amount of Paid DL | Payment Request |
|---|---|---|---|---|
| 2020.02.10.13.10 | Woogos. 30,000KRW | 50% | 250 DLs | Request |
| 2020.02.12.09.30 | Starbucks. 50,000KRW | 30% | 150 DLs | Request |

Payment Request

FIG. 7

Real-Time Deal <RTD>

- Store Name — Input Store Name ① — Search ②
- Payment Amount — Input Payment Amount ③ — OK ④
- Approval Number — ⑤ — OK ⑥
- Real-Time Deal — Request Deal ⑦ — Request Deal Again ⑧
- Accumulated DL Amount — ⑨ DL(s)

FIG. 8

```
○ Issue Approval Number    ○ List of Issued Approval Number
                            ○ Charge Advertiser Points ○ Owned Advertiser Points   ①      1,000,000   AD point ○ Purchaser Payment Amount  ②                  KRW ○ Approval Number           ③         O K ④
```

FIG. 9

| Date/Time | Payment Method | Amount | Approval Number |
|---|---|---|---|
| 2020.2.10.15.00 | Cash Payment | 50,000 KRW | 123456 |
| 2020.2.10.08.10 | Card Payment | 100,000 KRW | 234567 |
| 2020.2.14.13.00 | Card Payment | 70,000 KRW | 345678 |
| 2020.2.15.20.20 | Card Payment | 300,000 KRW | 456789 |
| 2020.2.16.21.40 | Card Payment | 150,000 KRW | 567890 |

FIG. 10

```
◦ Store Name :
◦ Business Registration Number :
◦ Store Owner :
◦ Address :
◦ Contact Number
  Store Phone Number :
  Cell Phone Number :
  E-Mail Address :
◦ Sales Product/Service :

◦ Selet Service:   Store ⊙    Delivery ⊙    All ⊙
```

ID and Password Setting

FIG. 11

```
Advertiser Mr. HONG

◦ Currently Owned AD Point      [ 35,000 ]  AD point

◦ Charged Amount of AD Point    [ 500,000 ] KRW  <Cash, Card>
  − Charge 1 KRW = 1 AD Point                    20% Extra Pay ◦ Charge AD Point               [ 500,000 ] AD point

* Cash Payment ⊙    * Card Payment ⊙    * DL Payment ⊙
```

FIG. 12

- One Year, 365 Days    [ ○ ]    Expires December 30, 2022
- 30 Days <One Month>   [ ○ ]    Expires on April 20, 2022
- Daily Time Setting <February 16, 2020>
  AM : ☐☐:☐☐ ~ PM : ☐☐:☐☐

[ Setting ]

FIG. 13

| Request Real-Time Deal |
| RealTimeDeal |

| Delivery Service |

| DL Agency |
| [DL Wallet] |

FIG. 14

| RTD |
|---|
| Region |
| Seoul/Gyeonggi-do/Gangwon-do/Daejeon/Sejong/Cheonan/Daegu |
| Korean Food/Chinese Food/Western Food/Chicken/Pizza |

| Image | Store Name<br>Address<br>Contact Number  02-0000-0000 | Order |
|---|---|---|
| Image | Store Name<br>Address<br>Contact Number  02-0000-0000 | Order |
| Image | Store Name<br>Address<br>Contact Number  02-0000-0000 | Order |
| Image | Store Name<br>Address<br>Contact Number  02-0000-0000 | Order |
| Image | Store Name<br>Address<br>Contact Number  02-0000-0000 | Order |

REAL TIME DEAL SYSTEM USING MOBILE ADVERTISEMENT PLATFORM AND METHOD THEREFOR

CROSS-REFERENCE TO RELATED APPLICATION

The present application is a national stage filing under 35 U.S.C § 371 of PCT application number PCT/KR2020/006926 filed on May 28, 2020, which is based on and claims priority to Korean Patent Application No. 10-2020-0031959 filed on Mar. 16, 2020, in the Korean Intellectual Property Office, which are incorporated herein by reference in their entireties.

TECHNICAL FIELD

The present invention relates to a system and method for negotiating a price in real-time when purchasing a product or service in an offline store while providing a mobile advertising platform.

BACKGROUND ART

There is disclosed a system that requests and receives discount information for each credit card company that can be used for a product that a customer wants to pay offline from a payment relay server and applies the received discount information to make a payment. However, no system or method has been proposed to promote the influx of customers to offline stores by providing discount benefits to customers instead of receiving a predetermined advertising fee from each offline store.

DISCLOSURE OF INVENTION

Problem to be Solved by the Invention

The present invention provides a system and method that enable purchasers who want to purchase products or services by visiting an offline store or using a delivery service to obtain a discount within a predetermined range by performing a real-time deal on the purchase price using a mobile app installed in their terminal.

In addition, the present invention provides a system and method that can always provide a discount at a predetermined rate to all purchasers without fear of exhaustion of resources by using advertising fees paid by a seller when selling products or services as a resource for a real-time deal.

In addition, the present invention provides a self-replicating system and method in which a purchaser gets the motivation to participate in a real-time deal and actively recommends another purchaser by providing various opportunities for a purchaser to accumulate RTD points free of charge instead of deducting the purchaser's RTD points when the purchaser requests a deal.

Means for Solving the Problem

A Real-time Deal (RTD) method, according to the present invention, includes the steps of receiving a request to issue an RTD approval number; generating and transmitting an RTD approval number; receiving an RTD request including the RTD approval number; generating and transmitting an RTD discount rate in response to the RTD request; and paying a virtual currency corresponding to the discount amount according to the RTD discount rate.

In addition, the step of receiving a request to issue an RTD approval number is receiving the issue request from a seller terminal of an offline store, the step of transmitting an RTD approval number is transmitting the RTD approval number to the seller terminal, the step of receiving the RTD request is receiving the RTD request from a portable purchaser terminal, the step of transmitting an RTD discount rate is transmitting the RTD discount rate to a purchaser terminal, and the step of paying the virtual currency is accumulating the virtual currency in a purchaser's account corresponding to the portable purchaser terminal.

In some cases, the step of receiving a request to issue an RTD approval number is receiving the issue request from a seller terminal of an offline store, the step of transmitting an RTD approval number is transmitting the RTD approval number to a portable purchaser terminal, the step of receiving an RTD request is receiving the RTD request from the portable purchaser terminal, the step of transmitting the RTD discount rate is transmitting the RTD discount rate to the portable purchaser terminal, and the step of paying a virtual currency is accumulating the virtual currency in a purchaser's account corresponding to the portable purchaser terminal.

In addition, the RTD discount rate is randomly determined between 10% and 100% of the price of a product or service subject to a discount.

In addition, whenever the RTD discount rate is transmitted, a step of deducting a purchaser's RTD points accumulated in the purchaser's account in proportion to the price of the products or services is further included.

In addition, a step of deducting a seller's AD points accumulated in the seller's account corresponding to the seller terminal in proportion to the price of the products or services is further included.

In addition, the RTD approval number is generated only when the balance of a seller's AD points accumulated in the seller's account is equal to or greater than a reference value.

In addition, the request to issue an RTD approval number and the RTD request include payment information for the products or services, and the generation of an RTD discount rate is only performed when the payment information included in the request to issue an RTD approval number is the same as the payment information included in the RTD request.

In addition, the method further includes a step of receiving the RTD request again after transmitting the RTD discount rate and generating and transmitting another RTD discount rate in response thereto.

In addition, the method further includes a step of displaying an RTD resource balance on the portable purchaser terminal.

In addition, a payment method included in the payment information includes cash, card, and electronic payment service, but virtual currency is not included in the payment method.

In addition, the RTD points can be accumulated in the purchaser's account through membership registration, member's purchase of products or services, recommendation of friends for membership registration, and purchase of products or services by recommended friends.

On the other hand, the step of receiving a request to issue an RTD approval number is receiving the issue request from a delivery service provider terminal, the step of transmitting an RTD approval number is transmitting the RTD approval number to the delivery service provider terminal, the step of receiving an RTD request is receiving the RTD request from a portable purchaser terminal, the step of transmitting an RTD discount rate is transmitting the RTD discount rate to the portable purchaser terminal, and the step of paying a virtual currency is accumulating the virtual currency in a purchaser's account corresponding to the portable purchaser terminal.

Effect of the Invention

The present invention provides a system and method that enable purchasers who want to purchase products or services by visiting an offline store or using a delivery service to obtain a discount within a predetermined range by performing a real-time deal on the purchase price using a mobile app installed in their terminal.

In addition, the present invention provides a system and method that can always provide a discount at a predetermined rate to all purchasers without fear of exhaustion of resources by using advertising fees paid by a seller when selling products or services as a resource for a real-time deal.

In addition, the present invention provides a self-replicating system and method in which a purchaser gets the motivation to participate in a real-time deal and actively recommends another purchaser by providing various opportunities for a purchaser to accumulate RTD points free of charge instead of deducting the purchaser's RTD points when the purchaser requests a deal.

BRIEF DESCRIPTION OF DRAWINGS

FIG. 2 to FIG. 9 are schematic diagrams showing a display screen of a purchaser terminal when an RTD app is operated in the purchaser terminal according to some embodiments of the present invention.

MODE(S) FOR CARRYING OUT THE INVENTION

The description of the embodiments disclosed in this specification is only illustrated to describe the embodiments, and the embodiments, according to the concept of the present invention, may be embodied in various forms. The scope of the present invention is not limited to the embodiments described herein.

Terms such as first or second may describe various components, but the terms should not limit the components to specific ones. The terms are used only to distinguish one component from another. For example, without departing from the scope of rights according to the concept of the present invention, a first component may be termed a second component. Similarly, a second component may also be termed a first component.

When a component is referred to as being "connected" or "coupled" to another component, it may be directly connected or coupled to the other component; however, it should be understood that other components may exist in between. On the other hand, when a component is referred to as being "directly connected" or "directly coupled" to another component, it should be understood that no other component exists in between. Other expressions describing the relationship between components, such as "between" or "adjacent to," should be interpreted similarly.

The terminology herein describes particular embodiments only and is not intended to be limiting. As used herein, the singular forms "a," "an," and "the" are intended to include the plural forms, including "at least one," unless the content clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, exemplary embodiments of the present disclosure will be described in detail with reference to the accompanying drawings.

Figure 1:
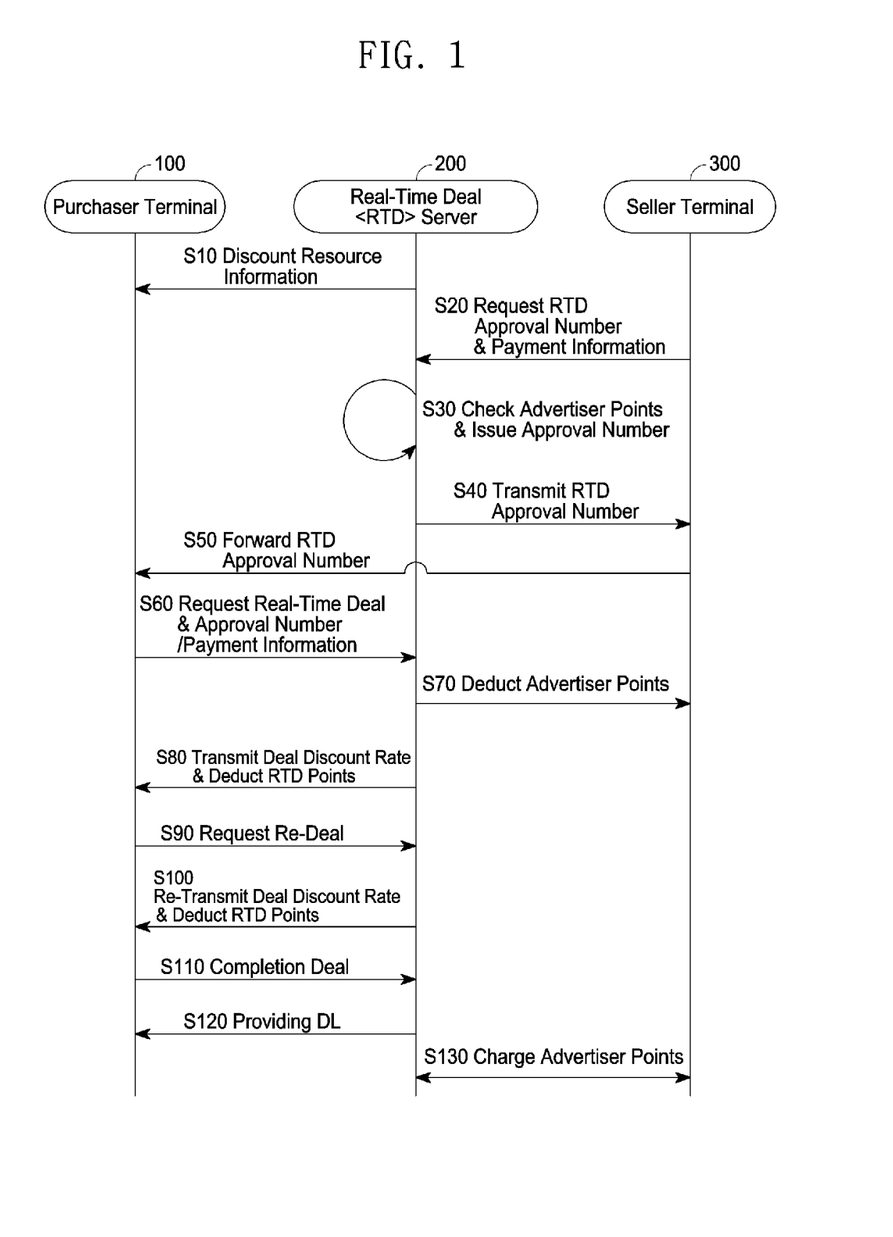
FIG. 1 is an overall flowchart showing a real-time deal method using a mobile advertisement platform according to some embodiments of the present invention.

FIG. 1 is an overall flowchart showing a real-time deal method using a mobile advertisement platform according to an exemplary embodiment of the present invention.

Components of Real-Time Deal System

FIG. 1 illustrates only the main components of a real-time deal system using a mobile advertisement platform according to an exemplary embodiment of the present invention. The illustration and description of common components necessary for performing payment according to product/service purchase, such as a wired/wireless communication network, a payment gateway (PG), and a credit card company server, will be omitted.

A real-time deal (hereinafter also referred to as 'RTD') system basically includes a purchaser terminal (100), a real-time deal server (or RTD server) (200), and a seller terminal (300).

A purchaser terminal (100) is a portable smartphone or other smart devices in which a dedicated app (RTD app) that is required to perform a real-time deal of the present invention is installed and operated. A purchaser is a person who has completed membership registration by accessing an RTD server (200) when installing the RTD app. The purchaser's membership and transaction information are stored and managed in the database of the RTD server (200).

A seller terminal (300) is a PC, a laptop, a smartphone, or other smart devices in which a store app that is required to perform a real-time deal communicating with the payment system (Point Of Sales, POS) of offline stores, such as restaurants and coffee shops, is installed and operated. A seller is also a person who has signed up as a seller member, and the seller's membership and transaction information are stored and managed in the database of the RTD server (200).

As an RTD server (200) is a remote server that provides registered purchasers and sellers with a real-time deal (RTD)

service, it is configured to perform the functions of, among others, membership management, RTD app control, RTD discount rate determination, and point management for purchasers and sellers.

Virtual Currency and Points

In the present invention, virtual currency, RTD points, and advertiser points are used.

When a purchaser selects a product or service to purchase and performs payment, the payment can be made with cash, wire transfer, card (credit card, debit card, app card, etc.), easy payment, or electronic payment service app (Naver Pay, Kakao Pay, PayPal, etc.) installed in a purchaser terminal (100) as well as using a predetermined virtual currency used for the present invention (hereinafter referred to as "Dilling" and denoted as "DL").

A purchaser may receive DL corresponding to the amount discounted through a real-time deal from the RTD server (200) and accumulate it in the purchaser terminal (100), or the purchaser may purchase DL from separate virtual currency exchanges and accumulate it in the purchaser terminal (100). Then the purchaser may use the accumulated DL when purchasing products/services at an offline store. The term 'accumulating' in the purchaser terminal (100) includes accumulating the corresponding DL in the purchaser's account in the RTD server (200) and showing the accumulated DL on the purchaser terminal (100) to inform the accumulation status. It is also the case for RTD points, which will be described later.

Apart from DL, the purchaser must secure points for a real-time deal, that is, RTD points in advance. The purchaser may secure RTD points through a predetermined event provided by the RTD server (200), such as membership registration and friend recommendation in the RTD server (200). For example, the RTD server (200) accumulates 10,000 RTD points to the purchaser when the purchaser registers as a member and accumulates 10,000 RTD points each time they directly recommend another person to join. When a directly recommended member recommends another member again, the above purchaser becomes an indirect recommender, and 5,000 RTD points are accumulated. Members who have joined through recommendation will receive the same points as above.

In addition, whenever a directly recommended member makes a payment with cash (including wire transfer, hereinafter referred to as "cash") or card (including electronic payment service, hereinafter referred to as "card"), 10% of the payment amount is accumulated to the purchaser who directly recommended the member as RTD points, and 5% of the payment amount is accumulated to the purchaser who indirectly recommended the member as RTD points when an indirectly recommended member pays by cash or card. However, if the recommended or referred member pays using DL, there is no RTD point accumulation. The accumulated RTD points are used for a real-time deal request and a DL purchase. For example, it can be purchased at 100 RTD points=100 KRW=1 DL.

The DL, a virtual currency used in the present invention, can be used in various ways such as RTD point purchase, advertiser point purchase, products/services payment, etc. The more a purchaser uses the RTD service of the present invention, the more DL can be secured to the purchaser, and the more a seller sells products/services in addition to purchasing DLsby cash or card, the more DL can be secured to the seller. The DLs secured in this way may be sold by a purchaser or seller at a discount rate of, for example, 1 DL=90 KRW at a DL trading agency, a separate trading agency. However, the process at the DL trading agency is beyond the scope of the present invention, so a detailed description will be omitted in this specification.

The present invention has a high effect on attracting a purchaser to a store where a real-time deal(RTD) is possible because a substantial portion of the price of products/services (for example, 10% to 100% of the price) is discounted to the purchaser through the real-time deal(RTD). A high advertising effect can be provided to a seller registered as a store where a real-time deal is possible. Since the RTD app of a purchaser terminal (100) functions as a mobile advertising platform for advertising a seller's store and attracting customers, the seller bears the advertising cost accordingly. The burden of advertising expenses is made by using or deducting a predetermined amount of advertiser points (AD points) each time the customer purchases products/services and uses a real-time deal after the seller purchases the advertiser points (AD points) from the RTD server (200) (or an operator thereof).

For example, the deduction may be made in a way that corresponds to 1 KRW=1 AD point. When the seller first signs up as a seller member, the RTD server (200) pays, for example, 1,000,000 AD points to the seller for free. If the seller's advertiser points are exhausted or reduced to less than a predetermined amount in the future, the seller can purchase it for a fee. The seller can purchase the advertiser points at the rate of 1 AD point per 1 KRW, and in this case, the seller can pay the advertiser point purchase price using cash, card, or DL. In some cases, when paying with cash or card, 20% of advertiser points are additionally paid at the rate of 1.2 AD points per 1 KRW, and when paying with DL, advertiser points may be paid at the rate of 1 AD point per 1 KRW. In the case of cash and card payment, the payment amount becomes the sales revenue of the RTD server operator, so it is necessary to induce cash or card payment in consideration of the operator's profit rate.

On the other hand, an advertiser can be paid by DL when selling products/services to a purchaser and can also pay by DL when purchasing advertiser points. Through this process, a virtual currency called DL can be used in the RTD service system of the present invention. In particular, if advertiser points are purchased with DL received when selling a product/service, only the product/service cost is paid to buy the advertiser points corresponding to the product/service sales price. From the seller's point of view, it is possible to obtain the effect of saving more advertising costs.

Each Step of the Real-Time Deal Method

Now, a method in which a purchaser purchases products/services at a seller's store and performs a real-time deal using the RTD function will be described with reference to FIG. 1.

The process in which a purchaser pays a seller for products/services is performed in the ordinary way of payment. Although it is possible to make payments using DL, a real-time deal cannot be requested when the entire payment amount is paid using DL. Hereinafter, it will be described based on the case of payment using a common payment method such as cash or card, i.e., payment methods other than DL(however, a case of paying for one product/service by combining these common payment methods and DL will be included).

First, a purchaser operates the RTD app of the purchaser terminal (100) to receive real-time discount resource information indicating how much of the discount resource can be provided through a real-time deal from the RTD server (200) (S10). The purchaser terminal (100) displays the discount resource information received as currency, for example, "discount resource: 99,870,000 KRW". The discount resource information is updated in real-time to fluctuate the displayed amount.

Subsequently, the purchaser requests the seller to issue an approval number for a real-time deal, that is, an RTD approval number, while requesting payment for products/services using cash or card. When the purchaser verbally requests to issue the RTD approval number to the seller, the seller requests to issue the RTD approval number to the RTD server (200) using the store app of the seller terminal (300) (S20). When an RTD approval number issuance is requested, information on payment for a related product/service is transmitted to the RTD server (200). The payment information includes at least the payment amount and payment methods (cash, card, DL, etc.). The real-time deal is not available only by DL when purchasing products/services. Therefore, if only DL is listed in the payment information, the step of requesting to issue an RTD approval number is not performed, and the procedure is terminated, or the system waits until ordinary payment information such as cash or card is input.

On the contrary, when the RTD app of the purchaser terminal (100), the store app of the seller terminal (300), and the RTD program of the RTD server (200) are all interlinked, a request may be transmitted to the store app of the seller terminal (300) through the button for a request to issue RTD approval number provided in the purchaser terminal (100). Accordingly, the store app of the seller terminal (300) may be implemented to combine the payment information of the corresponding product/service to generate a signal of a request to issue an RTD approval number and transmit it to the RTD server (200).

On the other hand, for the RTD server (200) to issue the RTD approval number, the seller's advertiser points must be greater than or equal to a predetermined amount, which is because the seller's advertiser points are deducted at the predetermined rate (e.g., 10% of the price of the products/services (i.e., the amount paid before a discount)) whenever the purchaser makes purchases through a real-time deal.

In response to the request to issue an RTD approval number from the seller terminal (200), the RTD server (200) checks whether the advertiser points remain in the seller's account and, if there is no abnormality, generates and stores the RTD approval number (S30). According to some embodiments, the minimum amount of advertiser points capable of generating an RTD approval number may be a relative amount, such as 10% of the products/services price, or an absolute amount, such as 10,000 advertiser points. In addition, to generate the RTD approval number, at least a portion of the payment amount corresponding to the products/services payment information must be made in cash and/or card. It is to provide an RTD discount only when actual revenue is generated through cash or card payment. Alternatively, it is possible to provide an RTD discount even for the part paid with DL.

Next, the RTD server (200) transmits the generated RTD approval number to the seller terminal (100) to complete the RTD approval number issuance procedure (S40). The seller verbally transmits the received RTD approval number displayed on the store app of the seller terminal (300) to the purchaser (S50). Alternatively, the RTD approval number may be directly forwarded from the RTD server (200) to the RTD app of the purchaser terminal (100). In this case, the same RTD approval number is simultaneously transmitted to the store app of the seller terminal (200) to inform that the real-time deal has been approved. Of course, to directly transmit the RTD approval number from the RTD server (200) to the purchaser terminal (100), it should be notified in advance that the purchaser is in the store of the seller to the RTD server (200) through the RTD app of the purchaser terminal (100), or the seller terminal (300) must provide the RTD app identification information of the purchaser terminal (100) obtained in advance from the purchaser terminal (100) (e.g., obtained in the payment process) to the RTD server (200) when a request to issue the RTD approval number is made.

When the RTD approval number is forwarded to the purchaser, the purchaser transmits an RTD request to the RTD server (200) using the RTD app of the purchaser terminal (100) (S60). The RTD request should include the RTD approval number received by the purchaser and payment information (i.e., payment amount and payment method, etc.) so that they can be compared with information stored in the RTD server (200). If there is an abnormality in the result of the information comparison, the RTD server (200) may stop the real-time deal procedure or request the purchaser terminal (100) to request RTD again with accurate information.

When the RTD request of the purchaser terminal (100), including the RTD approval number, is received by the RTD server (200), the RTD server (200) deducts the advertiser points accumulated in the corresponding seller's account by a predetermined amount (S70). When the amount of advertiser points accumulated in the corresponding seller's account is reduced to less than the reference value due to the deduction of the advertiser points, the advertiser points are charged again in the corresponding seller's account of the RTD server (200) through communication and payment between the RTD server (200) and the seller terminal (300) (S130). The RTD server (200) may notify the seller terminal (300) of the charging result. This step of deducting and charging advertiser points may be inserted at another step during the real-time deal process or may be repeatedly performed, if necessary, during the real-time deal process.

The advertiser point deduction can be applied uniformly as 10% of the original purchase price. It is to have the advertiser, the seller, spend 10% of the advertising fees whenever sales occur, and eventually, it has the effect of paying advertising fees only when sales occur. This effect occurs not only in-store sales but also in delivery sales.

On the other hand, if there is no abnormality in comparing the RTD approval number and payment information received from the purchaser terminal (100) with the RTD approval number and payment information related to the corresponding transaction stored in the database of the RTD server (200), the RTD server (200) transmits the deal discount rate to the purchaser terminal (100) (S80).

The real-time deal discount rate is randomly selected and presented between a minimum of 10% and a maximum of 100% within the range of deal discount resources. The resource for a real-time deal is the sum of the payment amount paid by the seller in cash or card for purchasing the advertiser points, which equals 10% of the total sales revenue of the RTD service-applied products/services sold by the sellers. If the resources for the real-time deal discount are sufficient, an RTD discount rate of 10% to 100% can always be offered for the payment amount of the purchased product/service. Even if all the resources for the real-time deal discount are exhausted, 10% of the payment amount for the product/service can be used as a resource for the real-time deal for that product/service, so a 10% RTD discount rate can be presented to the purchaser of that product/service. In summary, the minimum range of the RTD discount rate should be set to correspond to the advertiser points consumed by the seller to provide the RTD discount, and the maximum range of the RTD discount rate should be set to 100% of the product/service price, thereby maximizing the purchaser's desire to participate.

The result of the applicant's simulations confirmed that the real-time deal discount rate can always be maintained between 10% and 100% without exhaustion of real-time deal resources, even when there are only hundreds of purchasers and dozens of sellers. Therefore, the exhaustion of the real-time deal discount resources and the uniform application of the 10% discount rate is unlikely to occur except when the present invention is carried out with only a few purchasers and sellers.

When the RTD discount rate and/or the discounted payment amount received and displayed on the purchaser terminal (100) is satisfactory, the purchaser can click the deal complete button (or the payment button or the purchase confirmation button, etc.) to complete the deal. Still, when the displayed RTD discount rate or the discounted payment amount is not satisfactory, the purchaser can request a re-deal to the RTD server (200) by clicking the re-deal request button (S90). If the purchaser is satisfied with the RTD discount rate and/or the discounted payment amount received as a result of the re-deal request, the deal is completed by clicking the deal complete button (S100). Upon completion of the deal, the dilling (DL) corresponding to the amount discounted by the real-time deal is credited to the purchaser's account of the RTD server (200) immediately or within a predetermined period. At the same time, the accumulation status is notified to the purchaser terminal (100) (S120).

When the deal request step (S60) or the re-deal request step (S90) is performed, the RTD server (200) deducts a predetermined amount of RTD points held by the purchaser from the purchaser's account. For example, if the original payment amount before the real-time deal is 100,000 KRW or less, 1,000 RTD points are deducted, and if the original payment amount is between 100,000 and 200,000 KRW, 2,000 RTD points are deducted. An additional 1,000 RTD points are deducted for each increase in the original payment amount by 100,000 KRW.

Suppose all RTD points are consumed due to repeated RTD requests. In that case, RTD points can be acquired by purchasing products/services, recommending friends, purchasing products/services by direct or indirect referrals, etc. RTD points can also be purchased with DL, and a virtual currency acquired and accumulated from the RTD discount. Here, unlike the process of acquiring advertiser points, there is no case of purchasing RTD points for a fee using cash or a card in the process of acquiring RTD points. It is to induce users to use various opportunities the RTD server provides, such as membership registration and friend recommendations for acquiring RTD points. Through this process, the RTD server operator can introduce more members without putting a financial burden on the existing user members.

Figure 2:
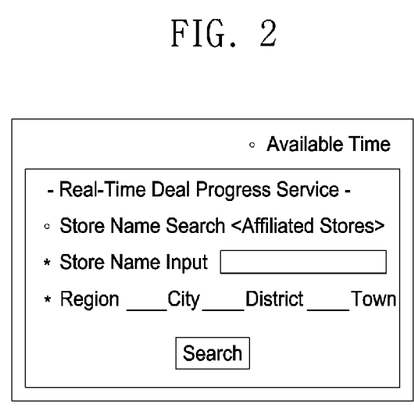

FIG. 2 is a schematic diagram showing a display screen of a purchaser terminal when an RTD app is operated in the purchaser terminal according to some embodiments of the present invention.

A user inputs the store name and/or approximate address and clicks the search button to check if the real-time deal is available at that store. The next step is carried out if the store is searched as an available store and within the available time of store/RTD service. If an RTD service is unavailable at the store, a message window such as "RTD request unavailable store" appears. On the other hand, in the case of a purchaser terminal using GPS, the availability of RTD service for individual stores can be immediately confirmed by checking the store's location using a map provided by the RTD app or linked with the RTD app. For example, suppose the locations of stores where the RTD service is available are displayed on the map screen provided by the RTD app. In that case, users can intuitively check whether the store they are currently located in is displayed as an RTD service available without entering a name or address. Furthermore, it is possible to select stores that can use the RTD service among nearby stores.

Figure 3:
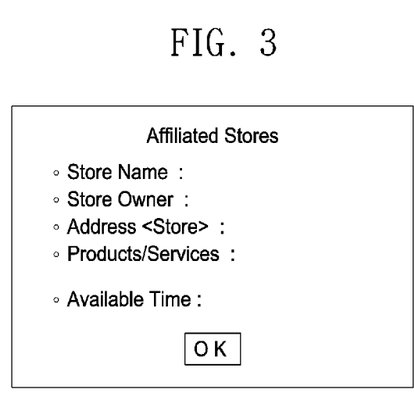

FIG. 3 is a schematic diagram showing a display screen of a purchaser terminal when an RTD app is operated in the purchaser terminal according to some embodiments of the present invention.

If the store selected by the user is a store where the RTD service is available, information related to the store is displayed on the screen. For example, store information appears on the screen, including at least one of the store names, owners' names, store addresses, product/service types, store available times, and store advertisements. And when the user selects the store information or clicks the OK button included in it, it proceeds to the next step.

Not only when the user selects a store but also while searching for a store before selecting it, by soft-touching each store location displayed on the map, a store advertisement, including an image or video related to the store, may be provided as store information. So, The RTD app on the user terminal serves as a great mobile advertising platform to advertise seller stores and attract customers.

Figure 4:
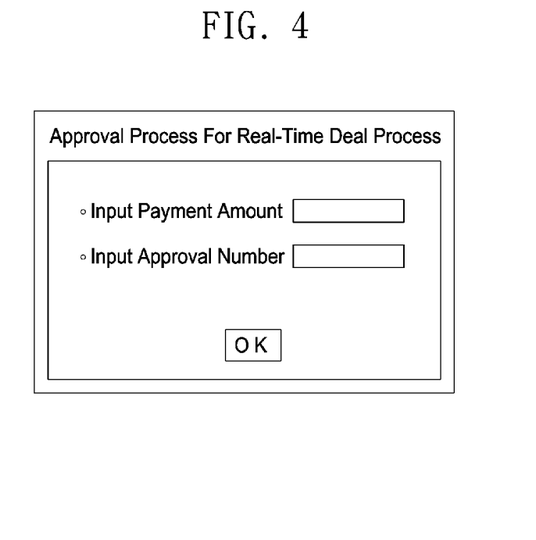

FIG. 4 is a schematic diagram showing another display screen of a purchaser terminal when an RTD app is operated in the purchaser terminal according to some embodiments of the present invention.

The user inputs the price of the product/service, and the original purchase amount, in the payment amount input window. Although not shown, at least one among cash, card, and DL can be selected as a payment method. RTD service is not available when payment is made by DL only. But RTD service is available when DL pays a portion of the purchase price, and the rest is paid by cash or card.

The user then inputs the RTD approval number received from the store into the approval number input window and clicks the OK button to transmit the real-time deal request to the RTD server.

Figure 5:
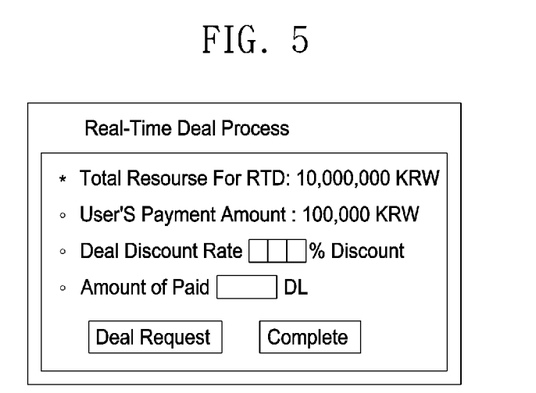

FIG. 5 is a schematic diagram showing another display screen of a purchaser terminal when an RTD app is operated in the purchaser terminal according to some embodiments of the present invention.

While the total resources for real-time deal discount and the user's payment amount, that is, the original purchase amount, are displayed on the user terminal, if the RTD request button is clicked, the RTD discount rate (or the discounted amount or the resulting payment amount after the discount, etc.) is displayed. In addition, the amount of DL to be paid as a result of the deal is displayed. The RTD discount rate is always randomly determined between 10% and 100% of the original purchase price, and the amount of DL corresponding to the determined discount rate is credited to the user account of the RTD server and displayed on the screen of the user terminal.

Here, it is assumed that one dilling (DL)=100 KRW. Therefore, if the purchase price of 100,000 KRW, the original purchase price, is paid by cash or card and a 50% RTD discount rate is applied, 500 dillings (DL) equivalent to 50,000 KRW is paid to the user. If the user is satisfied with the determined discount rate and/or the received amount of DL, the user can complete the deal by clicking the complete button. However, when the user is dissatisfied with the result and wants to request a re-deal, the user can request a re-deal by clicking the deal request button or the re-deal request button (The display can be changed to "request for re-deal" depending on the situations). As described above, the user's RTD points are reduced whenever a deal is requested.

On the other hand, in the case of requesting a re-deal after the deal request, the RTD discount rate is again randomly determined within the range of 10% to 100% of the original purchase price, so there is no guarantee that the user will receive a larger discount through a re-deal in principle. However, depending on the system's design, the random discount rate range may be limited to give a larger discount by re-deals. In this case, even if the user consumes a significant amount of RTD points, the user can repeatedly request re-deals for products/services of a relatively high original purchase price.

Figure 6:
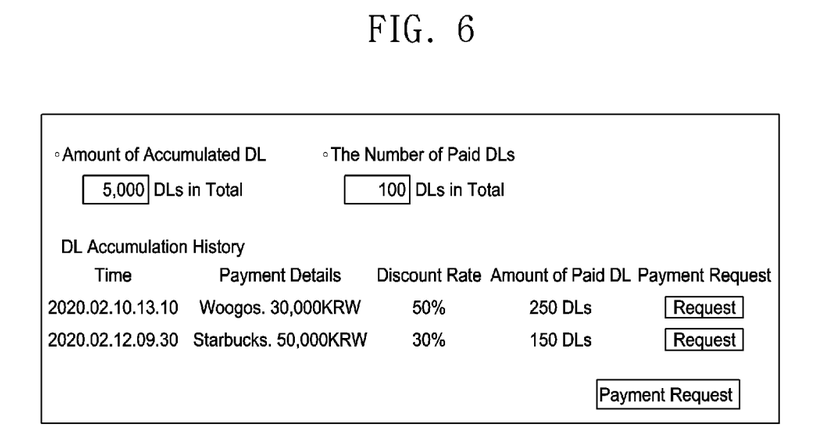

FIG. 6 is a schematic diagram showing another display screen of a purchaser terminal when an RTD app is operated in the purchaser terminal according to some embodiments of the present invention.

A user can check the amount of DL or RTD points accumulated in the user account and accumulation history through the RTD app. The RTD app provides the same information recorded in the corresponding user account on the RTD server.

FIG. 6 illustrates DL information, including accumulated DL, amount of paid DL, DL accumulation history, etc. The amount of accumulated DL means the total amount of DL accumulated in the user's account. The amount of paid DL means the amount of DL received from the RTD server among the DLs accumulated in the user account for the user to use the DLs using the user terminal. The amount of DL that can be paid is displayed as the "amount of paid DL" on the DL accumulation history at the bottom. When the user clicks the payment request button, the payment is made to the user terminal or an electronic wallet connected to it, and the amount of paid DL is displayed.

Figure 7:
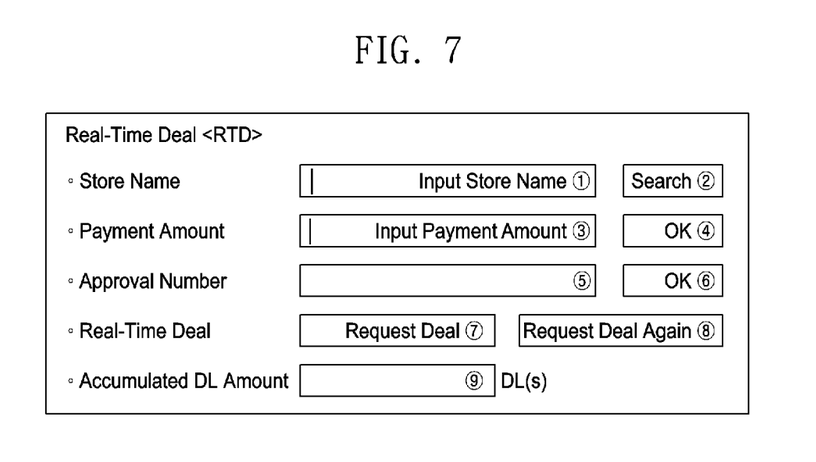

FIG. 7 is a schematic diagram showing a display screen of a purchaser terminal when an RTD app is operated in the purchaser terminal according to some embodiments of the present invention.

FIGS. 2 to 6 illustrate the display screen of the purchaser terminal appearing step by step in the real-time dealing process. FIG. 7 illustrates a display screen of a purchaser terminal in an embodiment where a real-time deal is performed on a single screen.

FIG. 7 displays buttons (1 and 2) for searching a store, buttons (3 and 4) for inputting a payment amount, buttons (5 and 6) for inputting an RTD approval number, buttons (7 and 8) for requesting a real-time deal and re-deal, and window (9) indicating an accumulated DL upon completion of a deal. Since the real-time deal process by using each button of FIG. 7 is substantially the same as that shown in FIGS. 2 to 6; the explanation of the process will be omitted.

Figure 8:
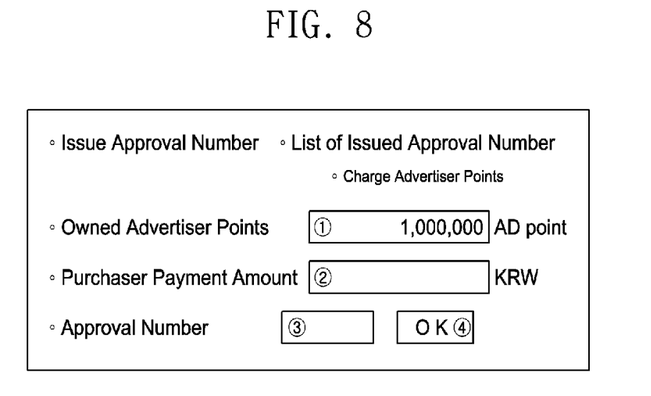
FIG. 8 to FIG. 12 are schematic diagrams showing a display screen of a seller terminal when a store app of the seller terminal is operated according to some embodiments of the present invention.

FIG. 8 is a schematic diagram showing a display screen of a seller terminal when a store app of the seller terminal is operated according to some embodiments of the present invention.

The display screen of the seller terminal displays the advertiser points (e.g., 1,000,000 AD points) (1) currently owned by the seller (that is, the advertiser). When the purchaser makes a payment for the product/service, the seller inputs the price of the product/service, the original purchase amount, in the payment amount input window (2). Although not shown, at least one of cash, card, and DL can be selected as a payment method. A combination of cash, card, and DL can be used for payment, but RTD service cannot be served if paid only by DL.

For a real-time deal or RTD, advertiser points corresponding to 10% of the purchaser's payment amount (i.e., 10% of cash or card payment excluding DL) are deducted. At this time, it is deducted at the rate of 1 KRW=1 AD point. Since an RTD approval number is not issued when the advertiser points are less than a predetermined amount, the advertiser must charge the advertiser points in advance using cash, card, or DL.

When the seller inputs the payment amount in the purchaser payment amount input window (2) and clicks the OK button (4), the RTD approval number issued by the RTD server, upon a request of the advertiser, is displayed in the approval number confirmation window (3). The seller will forward the received RTD approval number to the purchaser.

Figure 9:
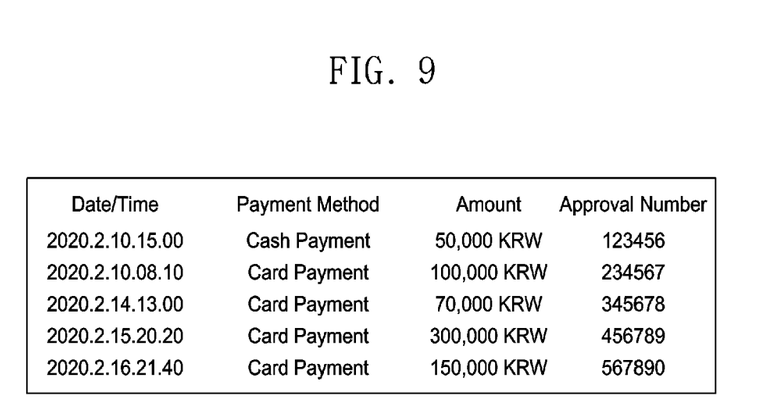

FIG. 9 is a schematic diagram showing a display screen of a seller terminal when a store app of the seller terminal is operated according to some embodiments of the present invention.

As FIG. 9 illustrates a list of RTD approval numbers, the seller can check the history of the customer's use of RTD service through the list of RTD approval numbers. The RTD approval number list may include, for example, dates and times, payment types, payment amounts, and approval numbers.

Figure 10:
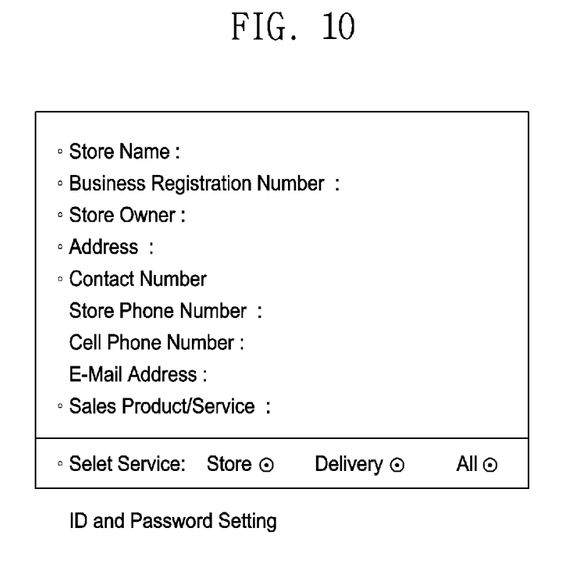

FIG. 10 is a schematic diagram showing a display screen of a seller terminal when a store app of the seller terminal is operated according to some embodiments of the present invention.

FIG. 10 is a member registration information screen for registering as a seller member. Besides basic information such as store names, business registration numbers, owners' names, addresses, contact information, and product/service types, product/service provisioning types can be chosen from in-store, delivery, or all. In addition, ID and password setting fields are provided for seller members to log in to the RTD server.

"In-store" refers to a provisioning type where the customers visit stores to receive the product/service, and "delivery" refers to a provisioning type where the product/service is delivered to the customer, and "all" means that both types are provided.

Although most of the procedures for providing RTD services in-store and on-delivery are similar, there may be some differences. From the customer's point of view, delivery availability is important, so clearly distinguishing it when registering as a store member is desirable.

Figure 11:
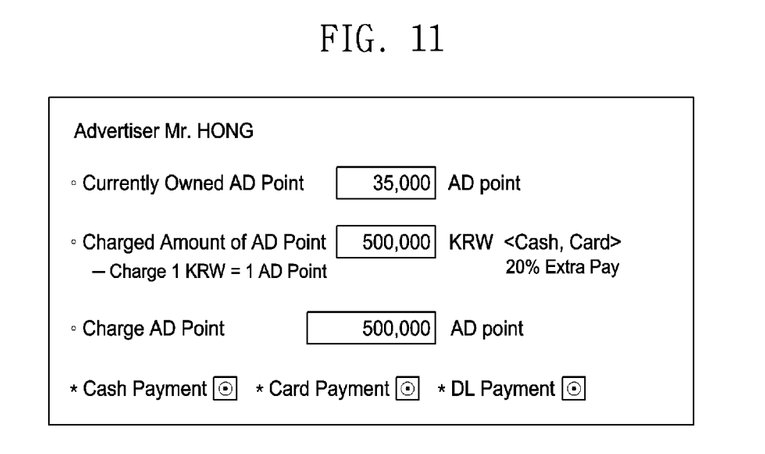

FIG. 11 is a schematic diagram showing a display screen of a seller terminal when a store app of the seller terminal is operated according to some embodiments of the present invention.

FIG. 11 is a point-charging screen for a seller to charge advertiser points. The advertiser points currently held by the advertiser are displayed. An input window for the amount of charge the advertiser wants to pay and a display window displaying the corresponding amount of AD points charged are illustrated. Alternatively, it is also possible to provide an input window for inputting the charging points and a display window for indicating the amount of payment corresponding to it.

It is important that you are allowed to choose DL other than cash and card as a resource for the charging. For example, if in case that it is designed as traded as 1 AD point=1 KRW and used as 1 DL=100 KRW, it is desirable to accumulate 100% of the used amount as AD Points when using DL, but 120% of the used amount are accumulated as advertiser points when paying with cash or card. If payment is made by the combination of cash, card, and DL, advertiser points of between 100% and 120% can be accumulated according to the usage of each resource.

Figure 12:
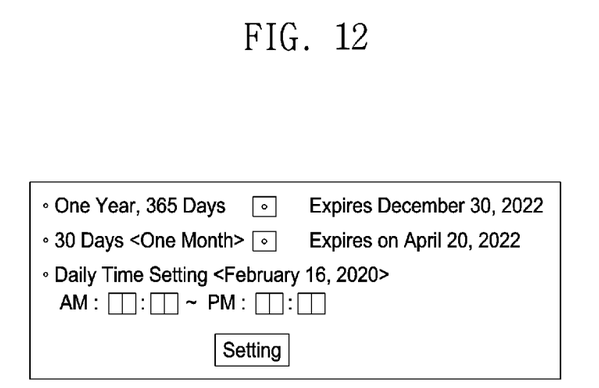

FIG. 12 is a schematic diagram showing a display screen of a seller terminal when a store app of the seller terminal is operated according to some embodiments of the present invention.

FIG. 12 is a screen for a seller to set the RTD service available time, and a period and time zone can be set. A seller may change this period or time zone as necessary.

Figure 13:
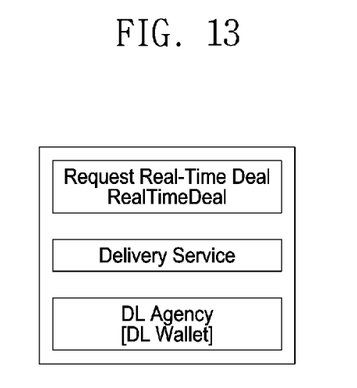
FIG. 13 is an initial schematic diagram showing a display screen of a purchaser terminal when an RTD app is operated in the purchaser terminal according to some embodiments of the present invention.

FIG. 13 is a schematic diagram showing an initial display screen of a purchaser terminal when an RTD app is operated in the purchaser terminal according to some embodiments of the present invention.

The initial screen of a purchaser terminal is configured to include an RTD section for using RTD service when visiting a store, a delivery service section for using RTD service while using delivery service, and a DL transaction section where you can connect to a DL agency to purchase and sell DL and a DL wallet to hold DL.

Figure 14:
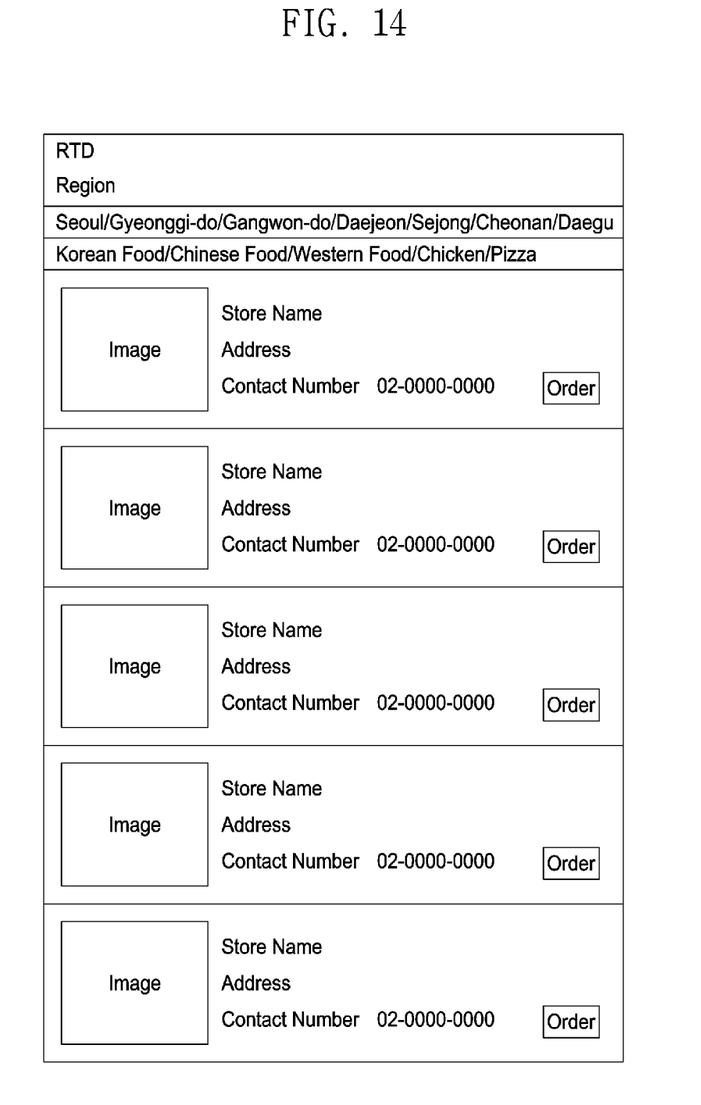
FIG. 14 is a schematic diagram showing a display screen of a purchaser terminal displaying a delivery service screen when an RTD app is operated in the purchaser terminal, according to some embodiments of the present invention.

FIG. 14 is a schematic diagram showing a delivery service screen when an RTD app is operated in the purchaser terminal, according to some embodiments of the present invention.

FIG. 14 is a screen for selecting available delivery stores when delivery service is chosen on the initial screen of the purchaser terminal. Users can search for the desired delivery stores by sorting the stores according to menus, regions, etc., and can directly order desired menus at the searched delivery store. Here, a delivery store may be a store where a delivery service is available as a direct sales place that provides its own product/service, or a delivery service specialized store that only provides a delivery service for product/service of other stores.

In addition, the RTD-related functions performed in the seller terminal may be performed in the seller terminal provided in the delivery store. Still, they may be performed in the same manner in the delivery service provider terminal carried by a delivery person. However, even if there are multiple delivery service provider terminals, it is preferable that one seller's account of the corresponding delivery store is maintained and its related AD points are managed.

The invention claimed is:

1. A real-time deal (RTD) method operated on an interlinked system composed of one or more portable purchaser terminals, one or more seller terminals, a real-time dealer server (RTD server), a payment gateway, and a mobile advertisement platform, wherein each of the portable purchaser terminals and seller terminals are pre-registered with the RTD server, the method comprising:
retrieving and receiving in real-time from the RTD server, discount resource information indicating how much can be provided through a real-time deal from the RTD server, by a portable purchaser terminal of a purchaser who has one or more RTD points accumulated in an account of the purchaser, via a real-time-deal (RDT) app installed on the portable purchaser terminal of the purchaser;
displaying the received discount resource information on the portable purchaser terminal via the RTD app, wherein the RDT app is a set of executable computer codes installed and executed on one or more tangible storage medium of the portable purchaser terminal;
generating a display interface, via the RTD app on the portable purchaser terminal of a purchaser, comprising a selectable button configured to generate a request to issue an RTD approval number;
in response to selection of the selectable button, transmitting, from the purchaser and via the portable purchaser terminal's RDT app to a seller terminal of a seller who has one or more Advertisement (AD) points accumulated in an AD account of the seller, a request to issue an RTD approval number;
receiving, by the seller terminal, the transmitted request to issue the RTD approval number;
upon receiving the request to issue the RTD approval number from the purchaser, transmitting, by the seller terminal and via a store application (app) installed on the seller terminal of the seller, a request for the RTD approval number to the RTD server, the request for the RTD approval number comprising payment information for a related product/service, the payment information including a payment amount and a payment method, and wherein the store app installed on the seller terminal of the seller is a set of executable computer codes installed and executed on one or more tangible storage medium of the seller terminal;
determining, by the RTD server, that the seller's one more AD points accumulated in AD account of the seller are greater than or equal to a predetermined amount;
upon determining that the seller's one more AD points are greater than or equal to a predetermined amount, generating the RTD approval number and storing the RTD number and the payment information from the request for the RTD approval number on a database of the RTD server;
transmitting, by an RTD program installed on the RTD server, the generated RTD approval number to the store app on the seller terminal of the seller, wherein the RTD program is a set of executable computer codes installed and executed on one or more tangible storage medium of the RTD server;
displaying, on the store app of the seller terminal of the seller, the received RTD approval number;
transmitting, by the store app of the seller, the received RTD approval number to the RDT app on the portable purchaser terminal of the purchaser;
receiving, by the RTD server and from the RDT app installed on the portable purchaser terminal of the purchaser, an RTD request, the RTD request including the RTD approval number and the payment information;
verifying, by the RTD server, the RDT approval number and the payment information included in the RTD request by comparing it against the RTD approval number and the payment information stored in the database of the RTD server and determining that the information matches;
at least in part in response to the verifying, determining, by the RTD server, whether the seller's one more AD points accumulated in AD account of the seller are greater than or equal to a second predetermined amount;
in response to determining that the seller's one more AD points accumulated in AD account of the seller are greater than or equal to the second predetermined amount, deducting, by the RTD server, the second predetermined amount of AD points from the AD account of the seller;
in response to determining that the seller's one or more AD points accumulated in the AD account of the seller is less than the second predetermined amount, charging, by the RTD server, the seller for the second predetermined amount of AD points through communication and payment between the RTD server and the seller terminal;

at least in part in response to the verifying, generating, by the RTD server, an RTD discount rate;

transmitting the generated RTD discount rate, by the RTD server, to the RTD app on the purchaser terminal;

paying a virtual currency corresponding to a discount amount according to the RTD discount rate.

2. The real-time deal (RTD) method according to claim 1, wherein:

the seller terminal is associated with an offline store, and wherein the step of paying the virtual currency includes accumulating the virtual currency in the account of the purchaser corresponding to the portable purchaser terminal.

3. The real-time deal (RTD) method according to claim 2, wherein the RTD discount rate is randomly generated and is between 10% and 100% of a price of products or services subject to a discount.

4. The real-time deal (RTD) method according to claim 3, further comprising:

deducting the RTD points accumulated in the account of the purchaser in proportion to the price of products or services whenever the RTD discount rate is transmitted.

5. The real-time deal (RTD) method according to claim 4, further comprising:

deducting the AD points accumulated in the AD account of the seller in proportion to the price of the products or services.

6. The real-time deal (RTD) method according to claim 1, wherein the request to issue the RTD approval number includes payment information for products or services.

7. The real-time deal (RTD) method according to claim 6, further comprising:

receiving a second request for an RT approval number after transmitting the generated RTD discount rate, and generating and transmitting another RTD discount rate in response thereto.

8. The real-time deal (RTD) method according to claim 7, further comprising:

displaying an RTD resource balance on the portable purchaser terminal.

9. The real-time deal (RTD) method according to claim 8, wherein a payment method in the payment information includes cash, cards, and electronic payment services other than the virtual currency.

10. The real-time deal (RTD) method according to claim 9, wherein the RTD points are accumulated in the purchaser's account through membership registration, member's purchase of products/services, recommendation of friends for membership registration, and purchase of products/services purchases by recommended friends.

11. The real-time deal (RTD) method according to claim 1, wherein the seller terminal is a delivery service provider terminal, and the step of paying the virtual currency includes accumulating the virtual currency in the account of the purchaser corresponding to the portable purchaser terminal.

* * * * *